United States Patent [19]

Lacourse et al.

[11] Patent Number: 4,726,957
[45] Date of Patent: Feb. 23, 1988

[54] STARCH-BASED JELLY GUM CONFECTIONS

[75] Inventors: Norman L. Lacourse, Plainsboro; James P. Zallie, Bound Brook, both of N.J.

[73] Assignee: National Starch and Chemical Corporation, Bridgewater, N.J.

[21] Appl. No.: 19,099

[22] Filed: Feb. 26, 1987

[51] Int. Cl.$^4$ ................................................. A23G 3/00
[52] U.S. Cl. ..................................... 426/578; 426/660
[58] Field of Search ........................ 426/578, 579, 660

[56] References Cited

U.S. PATENT DOCUMENTS

| | | | |
|---|---|---|---|
| 2,678,276 | 5/1954 | North | 426/578 |
| 2,726,960 | 12/1955 | Bolanowshi | 426/578 |
| 3,137,579 | 6/1964 | Robinson | 426/578 |
| 3,218,177 | 11/1965 | Robinson et al. | 426/578 |
| 3,446,628 | 5/1969 | Schoch et al. | 426/578 |
| 3,687,690 | 8/1972 | Moore | 426/660 |
| 3,717,475 | 2/1973 | Germino | 426/578 |
| 4,120,987 | 10/1978 | Moore | 426/660 |
| 4,225,627 | 9/1980 | Moore | 426/578 |

*Primary Examiner*—Jeanette Hunter
*Attorney, Agent, or Firm*—Edwin M. Szala; Lori D. Tolly

[57] ABSTRACT

An acid- or enzyme-converted high amylose starch useful as a quick-setting gelling agent in a jelly gum confection is provided. The converted high amylose starch has an amylose content of 65-80% and has a 8.8% solids calcium chloride viscosity of 16-200 seconds. Jelly gum confections employing the converted starch in a blend with a starch having an amylose content of at least 25% in a concentration ranging from about 5-15% of the confection, based on total dry solids, are provided with desirable low hot flow viscosities for deposition, high gel strengths and improved set times.

8 Claims, No Drawings

STARCH-BASED JELLY GUM CONFECTIONS

This application is a continuation-in-part of Ser. No. 872,051, filed June 6, 1986, now abandoned.

This invention relates to improved starch-based jelly gum confections and a method for their preparation.

Jelly gum confections which typically include familiar candies such as gum drops, gum slices, fruit gums (imitation fruit pieces) and jellybeans are characteristically resilient, relatively rigid, and have a short texture. While many compositions have been employed in the preparation of such confections, most typically comprise an aqueous dispersion of various sweeteners and a gelling starch component. The aqueous dispersions are typically deposited hot into molds to set to shape. The aqueous dispersions preferably have thin hot viscosities which upon cooling set to provide firm gel structures.

The hot flow viscosity of the dispersion should be thin to afford easy handling during deposition. If the dispersion is too thick, misshaped candies may result due to nonuniform amounts of gum being deposited. Undesirable tailing may also occur which is a result of the inability of the thick dispersion to form a clean break after deposition into one mold prior to deposition into a subsequent mold. The threads connecting the gum pieces represent a loss to the finished goods yield.

Fluidity corn starches have been advantageously employed in jelly gum confections due to the thinner hot paste viscosities they exhibit. Accordingly larger quantities of fluidity corn starch may be employed in comparison to unmodified starch in order to give pastes of comparable hot flow viscosity. When these hot pastes are cooled, it has been shown that the gel strength of the fluidity starch paste is considerably greater than the gel strength of the unmodified starch paste. See Chemistry and Industry of Starch, Second Edition, R. W. Kerr, Academic Press Inc., New York (1950), pgs. 559-562 for a discussion regarding jelly gum confections and their properties.

Other embodiments of jelly gum manufacture have been taught in the following patents:

U.S. Pat. No. 3,218,177 (issued Nov. 16, 1965 to J. Robinson et al.) describes jelly gum confections which employ from about 5-10%, based on dry substance weight, of a starch or starch mixture containing an amylose to amylopectin ratio in the range of 75:25 to 40:60.

U.S. Pat. No. 3,446,628 (issued May 27, 1969 to T. Schoch et al.) describes a starch-based jelly gum confection which employs as a congealing agent a thin-boiling ceral starch having an amylose content not in excess of 35% and a fat content not in excess of 0.3%.

U.S. Pat. No. 4,225,627 (issued Sept. 30, 1980 to C. Moore) describes a method for preparing jelly gums as well as a variety of different-textured candies such as fondant creams and aerated confections which all contain high amylose starch as a congealing agent. (See U.S. Pat. Nos. 3,687,690 and 4,120,987 issued on Aug. 29, 1972 and Oct. 17, 1978 to C. Moore in which the properties of the latter confections are contrasted with jelly gum confections.) In the '627 patent, liquid confections were deposited into molds, allowed to set, and thereafter expelled from the molds by steam pressure. The high amylose starches suggested as useful contained at least 35% amylose and were preferably hydrolyzed. The examples illustrate starch jelly dispersions containing a mixture of an acid-hydrolyzed 55% amylose corn starch with an unhydrolyzed 55% amylose corn starch or a hydrolyzed thin boiling corn starch.

While advances have been made in the jelly gum manufacturing industry, there is still a need for providing confections which possess desirable low hot viscosity, acceptable gel strength and which exhibit improved set times. The ability of a jelly gum to set within a matter of a few hours (i.e., 2-6) as opposed to traditional set times of 24-48 hours would significantly improve production rates and thus reduce production costs.

Accordingly, it is an object of this invention to provide a starch which, when employed in a jelly gum confection, provides the confection with a desirable low hot viscosity, acceptable gel strength and a short set time.

SUMMARY

The above objects are achieved by employing as a quick-setting gelling agent, an acid- or enzyme- converted high amylose starch which has a 8.8% solids calcium chloride viscosity of 16-200 seconds and an amylose content of 65-80%. The starch is advantageously employed in an amount of at least 25% by weight in a blend with preferably less than 70% of a starch having an amylose content of at least 25% selected from the group consisting of an unconverted starch, a converted starch other than the acid- or enzyme-converted high amylose starch, and mixtures thereof. The starch blend provides a jelly gum confection, comprising on a dry substance basis, from about 70-95% of a sweetener, 5-15% starch and 0-20% of a confectionary ingredient selected from the group consisting of a flavorant, colorant, fat, oil, surfactant, humectant, vitamin, preservative and mixtures thereof, with a 20 second Bostwick viscosity at 74-84% solids in an aqueous dispersion of at least 14 cm. and a high gel strength after setting.

The converted high amylose starch of the invention preferably contains from about 67-72% amylose and is preferably prepared by conventional acid conversion techniques described herein.

DESCRIPTION OF THE PREFERRED EMBODIMENTS

The applicable starch bases which may be employed in preparation of the coverted high amylose starches useful herein may be derived from any high amylose plant source which contains concentrations of 65-80% amylose, including, for example, high amylose corn and wrinkled pea. We prefer to utilize the high amylose starch derived from high amylose corn hybrids.

Suitable conversion of the useful starches herein may be achieved by standard acid or enzyme conversion techniques. Acid conversion is preferred due to the ease in handling and recovery afforded by a granular starch as opposed to starch in dispersed form as necessitated by enzyme conversion.

In preparation of the converted starches by acid treatment, the granular starch base is hydrolyzed to the required calcium chloride viscosity in the presence of an acid, such as sulfuric or hydrochloric acid, at a temperature below the gelatinization point of the starch. The starch is slurried in water, and the acid (usually in concentrated form) is then added. Typically, the reaction takes place over an 8-16 hour period, after which the acid is neutralized with alkali (e.g., to a pH of 5.5), and the starch recovered by filtration.

In preparation of the converted starches by enzyme treatment, the granular starch base is slurried in water, and the pH is adjusted to about 5.6–5.7 with alkali or acid. A small amount of alpha amylase enzyme (e.g., about 0.02% on the starch) is added to the slurry, which is then heated above the gelatinization point of the starch. When the desired conversion is reached, the pH is adjusted with acid (e.g., to about 2.0) to deactivate the enzyme and the dispersion is held at the pH for a period of at least 10 minutes. Thereafter the pH may be readjusted. The resulting converted starch dispersion is usually jet-cooked to ensure complete solubilization of the starch and deactivation of the residual enzyme.

It should be appreciated that the degree of conversion, as indicated by the calcium chloride viscosity, is affected by the amount of acid or enzyme used as well as the time and temperature. The conversion conditions should be adjusted to provide the preferred viscosities indicated hereafter.

Blends of the acid- or enzyme-converted high amylose starch in an amount of at least 25% by weight with other suitable converted or unconverted starches having amylose contents of at least 25% are advantageously employed in a jelly gum formulation. The blends preferably contain less than 70%, and most preferably 10–60%, of the converted or unconverted starch in order to still provide the confection composition with a desirable low hot flow viscosity in addition to a high resultant gel strength.

Converted starches referred to as thin-boiling confectioner's cooking starches which include acid hydrolyzed or oxidized corn, sorghum, and wheat starches having amylose contents of 25–35% amylose are preferably employed in the blend, with acid hydrolyzed corn starch being most preferred.

The sweetener component of the gum formulation may include a wide array of sweeteners and sweetening agents traditionally employed in jelly gum manufacture. Typical sweetening compositions include, for example, combinations of sucrose, dextrose, fructose, maltodextrin, corn syrup, and invert syrup. Other nutritive lower and high saccharides as well as nonnutritive sweeteners (e.g., aspartame, saccharin, etc.) may also be employed.

The jelly gum confection herein may also advantageously contain various other optional confectionary ingredients including, for example, natural flavorants (preferably fruit) and artificial flavorants, coloring agents, fats, oils, surfactants, humectants, vitamins and preservatives.

The natural fruit flavorants useful in the present composition may include fruit purees and fruit puree concentrates which have a high moisture content. One may also advantageously employ dehydrated fruit solids in the preparation of the gum confections. The dehydrated solids may consist entirely of fruit. We preferably employ dried fruit solids prepared according to the procedure described in U.S. Pat. No. 3,940,505 (issued on Feb. 24, 1976 to B. Nappen et al.) where the fruit is drum dried in the presence of a suitable amount of a granular or pregelatinized starch. The disclosure of U.S. Pat. No. 3,940,505 is incorporated herein by reference.

Gum formulations having gel strengths greater than 470 grams after setting are preferred. It should be recognized by those skilled in the art, however, that in addition to the amount of starch employed in the formulation, the amount and composition of any optional confectionary ingredients employed will have an effect on the ultimate gel strength of the confection.

The jelly gum confections herein typically comprise, on a dry substance basis, from about 5–15% of the converted high amylose starch blend, about 70–95% sweetener solids and about 0–20% of one or more of the confectionary ingredients described above. The method of preparation of the jelly gum confections may be achieved by one of many conventional means. Typically, a two stage preparation technique is employed. In the first stage, the starch component and a portion or all of the sweetener component are homogenously dissolved in a suitable amount of water. If acid-converted high amylose starch is employed, the dissolution may be achieved by retort or jet cooking the granular starch in the presence of a major portion or all of the sweetener component. The slurry is cooked for an amount of time sufficient to gelatinize the starch. The total amount of water necessary for dissolution will typically range from about 10–30% of the total gum formulation.

In the second stage of preparation, any remaining sweetener as well as all additional confectionary ingredients employed are added to the dispersed gum slurry. Prior to deposition, the gum confection is concentrated, if desired, to a concentration preferably ranging between 74–84% solids.

The following examples will more fully illustrate the embodiments of this invention. In the examples, all parts and percentages are given by weight and all temperatures are in degrees Celsius, unless otherwise noted. The amylose content of the starches exemplified are only approximate percentages as values are only reliable within about a 4 percent range.

The following test procedures were used to characterize the useful converted starches herein and the jelly gum confections produced therewith.

A. Calcium Chloride Viscosity

I. 8.8% Solids Test

The calcium chloride viscosity of the converted high amylose starch is measured by using a Thomas Stormer Rotational Shear-Type Viscometer (manufactured by Arthur H. Thomas Co., Philadelphia, Pa.) standardized at 30° C., with a standard oil having a viscosity of 24.73 cps, which oil requires 23.12±0.05 seconds for 100 revolutions. As conversion of the starch increases, the viscosity of the starch decreases. Accurate and reproducible measurements of the calcium chloride viscosity are obtained by determining the time which elapses for 100 revolutions at a specific solids level. The general procedure is as follows: A total of 8.8 grams of the converted starch (anhydrous basis) is slurried in 100 grams of buffered 20% calcium chloride solution in a covered stainless steel cup, the slurry heated in a boiling water bath for 30 minutes with occasional stirring. Then, the starch solution is brought to the final weight (108.8 grams) with hot distilled water. The time required for 100 revolutions of the resultant solution at 81°–83° C., is measured three times in rapid succession and the average of the three measurements recorded.

The calcium choride solution is prepared as follows: A total of 264.8 grams of reagent grade calcium chloride dihydrate is dissolved in 650 ml. of distilled water in a tared 1 liter glass beaker. Thereafter 7.2 grams of anhydrous sodium acetate is dissolved in the solution. The solution is allowed to cool and the pH is measured. If necessary, the solution is adjusted with hydrochloric acid to pH 5.6±0.1. Finally, the solution is brought to weight (1007.2 grams) with distilled water.

II. 7.2% Solids Test

The calcium chloride viscosity test described above in Part I is employed with the exception that a 7.2 gram (anhydrous basic) sample of starch is cooked in the calcium chloride solution and the final weight of the starch solution to be evaluated is brought to a final weight of 107.2 grams.

A correlation of 8.8% solids versus 7.2% solids viscosity readings of a series of six acid hydrolyzed high amylose starch samples is provided below:

| CaCl$_2$ Viscosity Measurement (sec.) | |
|---|---|
| 8.8% Solids | 7.2% Solids |
| 95.6 | 40.6 |
| 71.6 | 39.0 |
| 58.7 | 29.3 |
| 40.5 | 24.5 |
| 31.5 | 19.9 |
| 30.2 | 20.4 |

B. Hot Flow Viscosity

I. Bostwick Viscosity

Hot flow viscosity of the jelly gum confection is measured by using a Bostwick Consistometer (manufactured by CSC Scientific Inc., Fairfax, Va.). The distance that 100 ml. of the confection at a temperature of 190°–200° F. (87°–93° C.) flows in 20 seconds upon release into a trough graduated in 0.5 cm. divisions is measured. The thinner (i.e., lower) the viscosity of the confection, the further it will travel in a given time period. At 78–84% solids, acceptable jelly gum confections should have a hot flow viscosity of at least 14 cm.

II. Ford Cup Viscosity

A standardized Ford cup fitted with a #4 orifice was employed. The Ford cup viscosity is the time (in seconds) required for 50 ml. of a confection sample at a temperature of 190°–200° F. (87°–93° C.) to flow through the orifice. The thinner (i.e., lower) the viscosity of the confection, the faster it will flow. For comparative purposes, a 50 ml. Ford cup viscosity of about 100 seconds corresponds to a Bostwick viscosity of about 19 cm. In order to ensure that the confection does not gel in the cup during evaluation, the cup is preheated to a temperature of about 70° C. prior to evaluation.

C. Gel Strength

Gel strength of the jelly gum confection is measured with a Stevens LFRA Texture Analyzer employing cylindrical probe #1 (6 mm, diameter, 34 mm. long) run at a speed of 0.5 mm./sec. The force (in grams) required to penetrate the confection a distance of 4 mm. with the #1 probe is measured three times and the average of the three measurements recorded.

EXAMPLE 1

This example describes the preparation of several acid-converted high amylose starches which were employed in the jelly gum confection formulations exemplified herein.

Acid converted high amylose starches were prepared by acid hydrolyzing a high amylose corn starch base having an amylose content of 67% amylose. A total of 1000 parts of the high amylose starch was suspended in 1500 parts distilled water and heated to 52° C. While the slurry was maintained at 52° C. a total of 2.5–60 parts of concentrated (37%) hydrochloric acid was added and the reaction was allowed to proceed for 16 hours. Each slurry was neutralized with sodium carbonate to a pH of approximately 4.5 and then brought to pH 5.5 with 3% aqueous sodium hydroxide. The starch slurries were filtered warm. The starch cakes were then resuspended in distilled water with the pH readjusted, if necessary, to 5.5. Thereafter each slurry was refiltered, washed three times with distilled water and air dried. The 8.8% solids calcium chloride viscosities of the starches ranged from 12.1 to 479 seconds.

EXAMPLE 2

Part A. This example evaluates the acid-converted high amylose starches prepared above in a conventional jelly gum confectionary formulation. It also compares gum formulations containing the acid converted high amylose starches of the present invention with those formulations employing converted and unconverted starches of similar or lower amylose contents.

The jelly gum formulation employed comprised the following ingredients;

|  | Parts | % Total Dry Solids |
|---|---|---|
| 62 D.E. Corn Syrup | 43.48 | 45.5 |
| Sucrose | 33.52 | 43.0 |
| Starch (anhydrous) | 9.0 | 11.5 |
| Water | 14.0 | 0 |
|  | 100.0 | 100.0 |

The confections were prepared according to the following procedure: With heating and stirring, the corn syrup (SWEETOSE 3300 obtained from A. E. Staley Manufacturing Co.) and sugar were admixed prior to the alternate addition of the starch and water. The slurry was heated to 190° F. (87.7° C.) at which point the percentage of soluble solids was measured with a hand held refractometer. All slurries contained 81 to 82.5% soluble solids. Each slurry was thereafter jet cooked at 330°–340° F. (165°–171° C.). A portion of each confectionary mass was immediately evaluated upon exit from the jet cooker according to the procedure described above to determine the hot flow viscosity. The remainder of each confectionary mass was deposited in 100 ml. glass jars. Gel strengths of the deposited gum formulations were measured after 5 and 22 hours. The results may be found in Table I-A.

The results show that at 11.5% of total confectionary solids, the acid-converted high amylose starches having amylose contents of 68% and calcium chloride viscosities between 185 and 72.3 seconds (Samples A-II and A-III) provided jelly gum formulations with lower hot flow viscosities and higher gel strengths in comparison to their unconverted base. It was also shown that a gum formulation employing an underconverted starch (Comparative Sample I) which exhibited an acceptable high gel strength had a hot flow viscosity which was unacceptably high.

The results also show that at 11.5% of total confectionary solids, Samples A-IV and A-V (high amylose starches having calcium chloride viscosities of 31.5 and 18.7 seconds, respectively) provided the formulations with low hot viscosities; however, the resultant gel strengths of the gums were less than that provided by their unconverted base. The starches are however useful when employed in a blend as evidenced by the evaluations described in Example 4.

The present example included Comparative Starch A-VI in order to show that an acid converted starch of relatively high amylose content which has been employed in the jelly gum industry is inferior to the starches of the present invention.

TABLE I-A

| Starch Sample | STARCH PROPERTIES | | | JELLY GUM PROPERTIES | | |
|---|---|---|---|---|---|---|
| | % Amylose (Approx.) | 8.8% Solids CaCl$_2$ Viscosity (sec.) | % Deposit Solids | 20 Sec. Bostwick Viscosity (cm.) | Gel Strength (g.) | |
| | | | | | 5 Hrs. | 22 Hrs. |
| Unconverted Control | 68** | — | 75.5 | 5.2 | 431 | 516 |
| Unconverted Control | 59 | — | 77.5 | 8.0 | 402 | 516 |
| A-I (comparative) | 68 | 479 | 75.5 | 7.9 | 438 | 551 |
| A-II | 68 | 184.8 | 76 | 14.5 | 509 | 589 |
| A-III | 68 | 72.3 | 76 | 15.0 | 508 | 596 |
| A-IV | 68 | 31.5 | 77 | 23.0 | 385 | 422 |
| A-V | 68 | 18.7 | 77 | >24 | 264 | 302 |
| A-VI (comparative)* | 55 | 29.3 | 77 | >24 | 210 | 261 |
| A-VII (comparative) | 68 | 15.3 | 77.5 | >24 | 265 | 272 |

*Converted high amylose starch exemplified in U.S. Pat. No. 4,225,627, referred to as MIRA-CREME and obtained from A. E. Staley Manufacturing Co. The starch is a potassium permanganate-oxidized starch having an amylose content of approximately 55% which is acid converted with sulfuric acid.
**Average of 67 and 69% measurements.

It was shown that control gum formulations which employed unconverted starches having amylose contents of 67 and 59% (and deposited at 75.5 and 77.5% solids, respectively) exhibited similar gel strengths. When these starches were acid converted to appoximately the same calcium chloride viscosity (29.3–31.5 sec.) and employed in gum formulations, it was shown that the gum formulations were then significantly different. The gum formulation employing comparative starch A-VI of the prior art had a much lower gel strength when deposited at the same solids level than the formulation which employed sample A-IV.

Part B. This example evaluates a series of acid-converted high amylose starches (prepared according to the procedure of Example I) in a jelly gum formulation at a lower slids level (9%) than than employed in Part A. The gum formulation comprised the following ingredients:

| | Parts | % Total Dry Solids |
|---|---|---|
| 62 D.E. Corn Syrup | 44.75 | 46.5 |
| Sucrose | 34.75 | 44.5 |
| Starch (anhydrous) | 7.0 | 9.0 |
| Water | 13.5 | 0 |
| | 100.0 | 100.0 |

The confections were prepared as in Part A and the results may be found in Table I-B.

The results showed a trend at the 9% starch solids level evaluated. The more hydrolyzed high amylose starch samples, when employed alone, provided jelly gum confections with lower gel strengths. All gel strengths were less than that of a confection employing the unconverted starch base.

TABLE I-B

| Starch Sample | STARCH PROPERTIES | | | JELLY GUM PROPERTIES | |
|---|---|---|---|---|---|
| | % Amylose (Approx.) | 8.8% Solids CaCl$_2$ Viscosity (sec.) | % Deposit Solids | 20 Sec. Bostwick Viscosity (cm.) | 24 hr. Gel Strength (g) |
| Unconverted Control | 73.5* | — | 76 | >24 | 406 |
| B-I | 73.5 | 90.4 | 77.5 | >24 | 371 |
| B-II | 73.5 | 68.9 | 76 | >24 | 353 |
| B-III | 73.5 | 55.6 | 76 | >24 | 319 |
| B-IV | 73.5 | 43.5 | 76 | >24 | 298 |
| B-V | 73.5 | 29.8 | 76 | >24 | 235 |
| B-VI | 73.5 | 27.0 | 76 | >24 | 250 |

*average of 71 and 75% measurements

EXAMPLE 3

This example illustrates the use of an acid-converted high amylose starch of the present invention in a jelly gum formulation as the sole starch component as well as in a blend with a conventional fluidity confectioner's starch.

The jelly gum formulation employed comprised the following ingredients:

| | Parts | % Total Dry Solids |
|---|---|---|
| 62 D.E. Corn Syrup | 43.48 | 45.5 |
| Sucrose | 31.52 | 40.4 |
| Starch Component (anhydrous) | 11.0 | 14.1 |
| Water | 14.0 | 0 |
| | 100.0 | 100.0 |

Three jelly gum confections were prepared according to the procedure described in Example 2. The starch components for the confections were as follows:
A—100% Starch Sample A-V (68% amylose, 18.7 sec. CaCl$_2$ viscosity)
B—40% Starch Sample A-V and 60% Fluidity Corn Starch
C—30% Starch Sample A-V and 70% Fluidity Corn Starch
The fluidity corn starch employed was FLOJEL ® G (an acid converted corn starch having an approximate amylose content of 28% and a water fluidity of about 65 obtainable from National Starch and Chemical Corp.). The evaluations of the gum formulations may be found in Table II.

TABLE II

| Starch Component | % Deposit Solids | JELLY GUM PROPERTIES | | |
|---|---|---|---|---|
| | | 20 Sec. Bostwick Viscosity (cm.) | Gel Strength (g.) 5 Hrs. | Gel Strength (g.) 24 Hrs. |
| A | 76.5 | >24 | 636 | 820 |
| B | 76.5 | >24 | 373 | 485 |
| C | 75 | >24 | 297 | 435 |

The results show that at a higher concentration in the gum formulation (14.1% as opposed to 11.5% of Example 2) the low viscosity starch A-V alone provided a jelly gum with a low hot viscosity as well as a high gel strength. It was shown that blends of this converted high amylose starch and less than 70% of a starch of lower amylose content were also useful herein providing a gum formulation with a low hot viscosity and an acceptable high gel strength.

EXAMPLE 4

This example further illustrates the useful starches of the present invention and their use in a jelly gum formulation in a blend with a conventional fluidity confectioner's starch.

The jelly gum formulations were prepared as in Example 2 employing the formulation of Example 3 with the exception that the amount of water employed during the preparation of gum slurries ranged from 11.2 to 14 parts in the formulation. The starch component comprised a blend of 40% of the converted or unconverted high amylose starch to be evaluated and 60% of FLOJEL ® G. The results may be found in Table III.

The results show that gum formulations employing starch blends with converted high amylose starch Samples A-II-V which had amylose contents of approximately 68% and 8.8% solids calcium chloride viscosities ranging from 18.7–184.8 seconds, exhibited acceptable low hot flow viscosities and gel strengths higher than that provided by a blend containing their unconverted high amylose base.

The high gel strengths provided by the blends is unexpected in view of the trend exemplified in Part B of Example 2 where converted high amylose starches provided lower gel strengths in comparison to their unconverted base in a similar formulation when employed as the sole starch component.

Comparative Samples A-VII and A-X, which had amylose contents of 68% and 8.8% solids calcium chloride viscosities less than 16 seconds were not useful even in a blend. The gums prepared therewith exhibited gel strengths less than the controls which is opposite to the properties provided by the blends containing slightly less converted Starch Samples A II-V.

The gel strengths of samples employing comparative Samples A-VI, A-VIII, and A-IX (acid converted starches of lower amylose content) in a blend were lower than the gel strengths of the gums containing the same amount of similarly converted higher amylose starch Samples A-IV and A-V.

EXAMPLE 5

This example further illustrates the useful starch blends of the present invention in a jelly gum formulation.

The jelly gum formulation employed comprised the following ingredients:

| | Parts | % Total Dry Solids |
|---|---|---|
| 62 D.E. Corn Syrup | 46.5 | 47.1 |
| Sucrose | 32.6 | 40.7 |
| Starch Blend (anhydrous) | 9.8 | 12.2 |
| Water | 11.1 | 0 |
| | 100.0 | 100.0 |

The jelly gum confections were prepared according to the precedure described in Example 2. The starch blend comprised 40% of the converted high amylose starch to be evaluated and 60% of FLOJEL ®G. The results may be found in Table IV.

The results again show that employing converted high amylose starch in a blend with a confectioner's fluidity starch provided gum formulations with desirable thin hot viscosities without having a deleterious effect on final gel strength of the jelly gum confection.

Variations in the compositions prepared in the Examples above allow the use of dehydrated fruit solids instead of fruit purees of fruit puree concentrates, typically employed in gum formulations, with similar results.

In summary, a jelly gum formulation is provided which exhibits an acceptable low hot flow viscosity and high gel strength as well as an improved set time due to the incorporation of an acid- or enzyme-converted high amylose starch having an amylose content of 65–80% amylose which has been converted to a specific calcium chloride viscosity. The jelly gum formulation employ-

TABLE III

| | JELLY GUM EVALUATION EMPLOYING STARCH BLEND | | | | | |
|---|---|---|---|---|---|---|
| | STARCH PROPERTIES | | | JELLY GUM PROPERTIES | | |
| Starch Sample[a] | % Amylose (Approx.) | 8.8% Solids CaCl₂ Viscosity (sec.) | % Deposit Solids | 20 Sec. Bostwick Viscosity (cm.) | Gel Strength (g.) 5 Hrs. | Gel Strength (g.) 18–24 Hrs. |
| Unconverted Control | 68 | — | 77.5 | 19.0 | N.D. | 363 |
| Unconverted Control | 59 | — | 76 | 21.5 | 247 | 366 |
| A-II | 68 | 184.8 | 75 | 16.0 | N.D. | 432 |
| A-III | 68 | 72.3 | 76 | 17.0 | N.D. | 480 |
| A-IV | 68 | 31.5 | 76 | 18.3 | N.D. | 502 |
| A-V | 68 | 18.7 | 76.5 | >24 | 373 | 485 |
| A-VI (comparative)[b] | 55 | 29.3 | 75 | >24 | 290 | 380 |
| A-VIII (comparative)[c] | 59 | 18.1 | 76 | >24 | N.D. | 433 |
| A-IX (comparative)[c] | 59 | 16.1 | 77.5 | >24 | N.D. | 412 |
| A-VII (comparative) | 68 | 15.3 | 77.5 | >24 | N.D. | 349 |
| A-X (comparative) | 68 | 12.1 | 76.5 | >24 | N.D. | 305 |

[a]Present in a concentration of 40% in the starch blend with the remaining 60% comprising FLOJEL ® G.
[b]MIRA-CREME (described in Table I).
[c]Acid-converted high amylose corn starch prepared according to the procedure of Example 1.
N.D. - Note determined.

ing the above starch in a starch blend exhibits a desirable low hot flow viscosity and a high gel strength in comparison to gum formulations prepared employing a blend containing the unconverted high amylose starch base as well as a converted starch of lower amylose content.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

TABLE IV

JELLY GUM EVALUATION EMPLOYING STARCH BLEND

| | STARCH PROPERTIES | | | JELLY GUM PROPERTIES | | |
|---|---|---|---|---|---|---|
| | % Amylose | 7.2% Solids | % Deposit | Ford Cup Viscosity | Gel Strength (g.) | |
| Starch Sample[a] | (Approx.) | CaCl$_2$ Viscosity | Solids | (sec.) | 6 Hrs. | 24 Hrs. |
| Unconverted Control | 69.5 | — | 76.1 | 92.5 | 337 | 402 |
| C-I | 69.5 | 45.9 | 75.7 | 66 | 362 | 414 |
| C-II | 69.5 | 45.6 | 76.0 | 55.4 | 361 | 413 |
| C-III | 69.5 | 38.9 | 75.7 | 59.1 | 367 | 423 |
| C-IV | 69.5 | 30.9 | 75.8 | 52.4 | 350 | 413 |
| C-V | 69.5 | 28.5 | 75.7 | 46.5 | 338 | 387 |
| C-VI | 69.5 | 23.3 | 75.8 | 49.5 | 332 | 397 |
| C-VII | 69.5 | 19.4 | 76.3 | 42.8 | 302 | 366 |
| Unconverted Control | 73.5[b] | — | 75.4 | 82.5 | 317 | 390 |
| D-I | 73.5 | 66.0 | 75.8 | 59.2 | 349 | 425 |
| D-II | 73.5 | 49.9 | 75.9 | 55.5 | 349 | 431 |
| D-III | 73.5 | 41.8 | 75.3 | 40.1 | 340 | 417 |
| D-IV | 73.5 | 35.5 | 75.3 | 36.4 | 324 | 400 |
| D-V | 73.5 | 20.0 | 75.7 | 35.0 | 326 | 371 |

[a]Present in a concentration of 40% in the starch blend with the remaining 60% comprising FLOJEL ®G.
[b]Average of 71 and 75% measurements.

We claim:

1. A jelly gum confection having a 20 second hot flow viscosity at 74-84% solids in an aqueous dispersion of at least 14 cm, and a high gel strength after setting comprising, on a dry substance basis, from about 70-95% of a sweetener, 5-15% of a starch blend, and from about 0-20% of a confectionary ingredient selected from the group consisting of a flavorant, colorant, fat, oil, surfactant, humectant, vitamin, preservative and mixtures thereof; wherein the starch blend comprises (a) from 25-99% of an acid- or enzyme-converted high amylose starch having an amylose content of 65-80% and a calcium chloride viscosity of about 16-200 seconds and (b) from 1-75% of a starch having an amylose content of at least 25% selected from the group consisting of an unconverted starch, a converted starch other than the acid- or enzyme-converted high amylose starch, and mixtures thereof.

2. The jelly gum confection of claim 1, wherein the blend comprises less than 70% of part (b).

3. The jelly gum confection of claim 1, wherein the high amylose starch of part (a) of the blend is the acid-converted starch.

4. The jelly gum confection of claim 3, wherein the confection comprises, on a dry substance basis, from about 85-95% of the sweetener and 5-15% of the starch blend; the jelly gum confection further characterized as having a gel strength of at least 470 grams.

5. The jelly gum confection of claim 1, wherein the starch of part (b) of the blend is the converted starch.

6. The jelly gum confection of claim 5, wherein the converted starch of part (b) of the blend has an amylose content of about 25-35% and is selected from the group consisting of corn, sorghum, and wheat.

7. The jelly gum confection of claim 6, wherein the starch blend consists of about 40-90% of the acid-converted high amylose starch of part (a) and about 10-60% of the converted starch of part (b).

8. The jelly gum confection of claim 1, wherein the confectionary ingredient is a flavorant present on a dry substance basis in an amount from 1-20% of the confection composition and comprises a fruit employed in dehydrated form.

* * * * *